United States Patent [19]

Gasser et al.

[11] Patent Number: 5,160,430
[45] Date of Patent: Nov. 3, 1992

[54] CAR WASH SYSTEM USING REVERSE OSMOSIS CONCENTRATE FOR INITIAL RINSING AND PERMEATE FOR FINAL RINSING

[75] Inventors: William J. Gasser, Palatine; Timothy J. Carco, Elgin; Anthony J. Justin, Chicago, all of Ill.

[73] Assignee: Brite-O-Matic Manufacturing, Inc., Arlington Heights, Ill.

[21] Appl. No.: 765,188

[22] Filed: Sep. 25, 1991

[51] Int. Cl.[5] .......................... B01D 17/12; B60S 3/04
[52] U.S. Cl. ............................... 210/138; 134/56 R; 134/109; 134/123; 210/167; 210/257.2; 210/409
[58] Field of Search ............................... 134/109–111, 134/56 R, 58 R, 123, 45; 15/DIG. 2; 210/138, 143, 167, 257.2, 321.69, 409, 411

[56] References Cited

U.S. PATENT DOCUMENTS 3,774,625 11/1973 Wiltrout .............................. 134/123
4,029,114 6/1977 Wiltrout .............................. 134/123
4,626,346 12/1986 Hall .................................... 210/257.2
4,865,058 9/1989 Crotts et al. ........................ 134/45
5,040,485 8/1991 Bailey et al. ....................... 134/123

FOREIGN PATENT DOCUMENTS 2831607 1/1980 Fed. Rep. of Germany ...... 210/167
2180436 11/1973 France ............................... 210/257.2

Primary Examiner—Robert A. Dawson
Assistant Examiner—Joseph Drodge
Attorney, Agent, or Firm—Willian Brinks Olds Hofer Gilson & Lione

[57] ABSTRACT

A rollover type car wash and rinse machine which uses permeate from a reverse osmosis unit for a final rinse operation. The machine is operator controlled to wash and initially rinse cars with a spray arch using raw water and concentrate from the reverse osmosis unit. A final rinse can then be performed with a second spray arch using permeate alone, and only after a wash and initial rinse has been performed.

5 Claims, 3 Drawing Sheets

CAR WASH SYSTEM USING REVERSE OSMOSIS CONCENTRATE FOR INITIAL RINSING AND PERMEATE FOR FINAL RINSING

FIELD OF THE INVENTION

This invention relates in general to car wash systems. More particularly, it relates to a roll-over type, semi-automatic car wash system which uses reverse osmosis to produce purified, final rinse water.

BACKGROUND OF THE INVENTION

Regardless of how a car is washed, the final rinse water normally contains minerals and impurities which leave water stains or residue marks upon evaporation. Traditionally, cars have been manually dry wiped with an absorbent cloth to avoid "spotting".

Previous automatic car wash systems have employed drying devices which attempted to eliminate or reduce the manpower needed to physically hand dry the car. Drying has most commonly been accomplished by a series of blowers which supply relatively high pressure air to blow away most of the rinse water and accelerate the evaporation of smaller droplets. These systems are inefficient because enough water is left on the car to require a worker to perform a final dry wipe with a cloth to avoid leaving water stains. In addition, the blowers consume large amounts of electrical energy.

Other prior art automatic drying devices for removing rinse water from cars include devices that sweep or draw absorbent materials across the wet surfaces. These devices are not always effective and are subject to accumulations of dirt and grime in the absorbent materials, requiring frequent removal, laundering and replacement.

In an effort to eliminate the need for hand drying or automatic drying devices, the reverse osmosis principle has been employed to purify the rinse water and remove the impurities which leave "spotting" or water stains upon evaporation. The purified reverse osmosis water dries spotless, eliminating the need for manual or automatic drying. Despite the benefits obtained by using reverse osmosis rinse water in car wash systems, the devices currently in use possess several drawbacks which reduce their effectiveness.

One drawback results from the fact that purifying water through the reverse osmosis process produces approximately one gallon of mineral-rich concentrate for each gallon of pure water produced. A typical final rinse operation requires nine to ten gallons of pure water. As a result, nine to ten gallons of mineral-rich concentrate normally become waste water which is discharged through the sewage system. Customers complain about the high levels of water consumption and the large amount of waste water which must be discharged down the sewer.

Another drawback is that when the system is not in operation for extended periods, such as overnight or during the weekends, the membrane in the reverse osmosis unit becomes contaminated with bacteria in a short period of time. This reduces the life of the membrane and results in high replacement and maintenance costs, as well as system inefficiencies.

Yet another drawback is occasioned by the fact that systems currently in use count each wash, initial rinse, and final rinse step in the operation as one cycle. Payment schedules are determined on the basis of the number of complete cycle operations. If a car is merely dusty and the operator chooses to use only the final rinse operation, the machine owner is not paid because a full cycle operation has not been used. Secondly, since the final rinse operation is used more frequently than the full cycle for which payment is received, the life expectancy of the component parts of the reverse osmosis system for full cycle operation is reduced and the system owners costs are increased. Finally, the system owners are unable to accurately monitor the number of final rinse operations which have been performed and, as a result, are unable to adhere to the desired maintenance schedule.

SUMMARY OF THE INVENTION

In view of the foregoing, it is the object of this invention to provide an improved car wash system employing reverse osmosis as a final rinse while greatly reducing the amount of waste water.

It is another object to provide a reverse osmosis system which assures prolonged membrane life in the reverse osmosis module.

It is a further object to provide a reverse osmosis car wash system which requires that the wash and initial rinse operations be performed before the final, pure water rinse can be effected.

The invention is embodied in a system including a roll-over type machine which employs a wash, initial rinse, and final rinse, and where the final rinse is performed with reverse osmosis purified water. A system controller prevents the reverse osmosis final rinse operation from being performed unless the car wash system first performs the wash and initial rinse (with unpurified water) operations. The system does not allow the final rinse operation to be performed as an independent operation.

The car wash system also reclaims and reuses the concentrate, or mineral-rich water, which is a by-product of the reverse osmosis process. The water is reused in the next wash, or in the initial rinse operation.

The system also uses reverse osmosis purified water to automatically flush concentrated solids and bacteria from the membrane in the reverse osmosis module after a predetermined period of time. When the membrane is not functioning, such as overnight and on weekends, the membrane housing is filled with pure, reverse osmosis water to prevent membrane bacteria growth. More specifically, during the final rinse operation the final rinse system controller automatically signals the raw water pump to send more water through the reverse osmosis module to replenish the pure water taken from the holding tank during the final rinse operation. When the pure water level reaches the level of a float switch located near the top of the pure water holding tank, the system controller commands the raw water pump to deliver enough water to produce three to four more gallons of pure water, at which point the pump is shut off. At the same time that the float switch communicates with the system controller to call for the additional feed (raw) water, the switch triggers a time delay in the controller. If the final rinse system is not used for a predetermined period of time, the system controller causes the extra three to four gallons of pure water to be pumped through the reverse osmosis module. The reverse osmosis membrane is flushed and then immersed in pure water when the system is not in operation, typically overnight or on weekends.

DESCRIPTION OF THE PREFERRED EMBODIMENT

Figure 1:
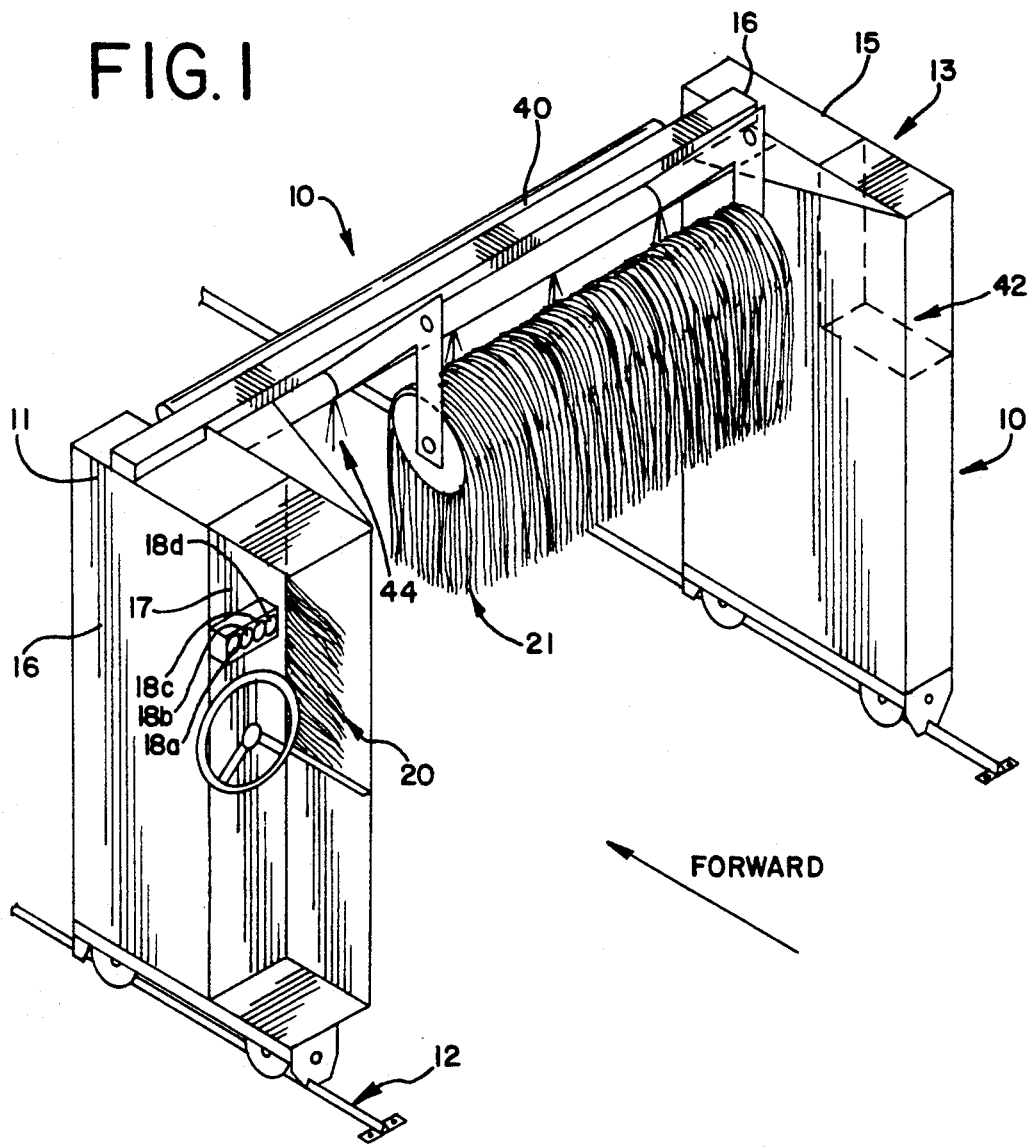
FIG. 1 is a perspective view of the back of a roll-over type, semi-automatic car wash machine incorporating the invention.
Figure 2:
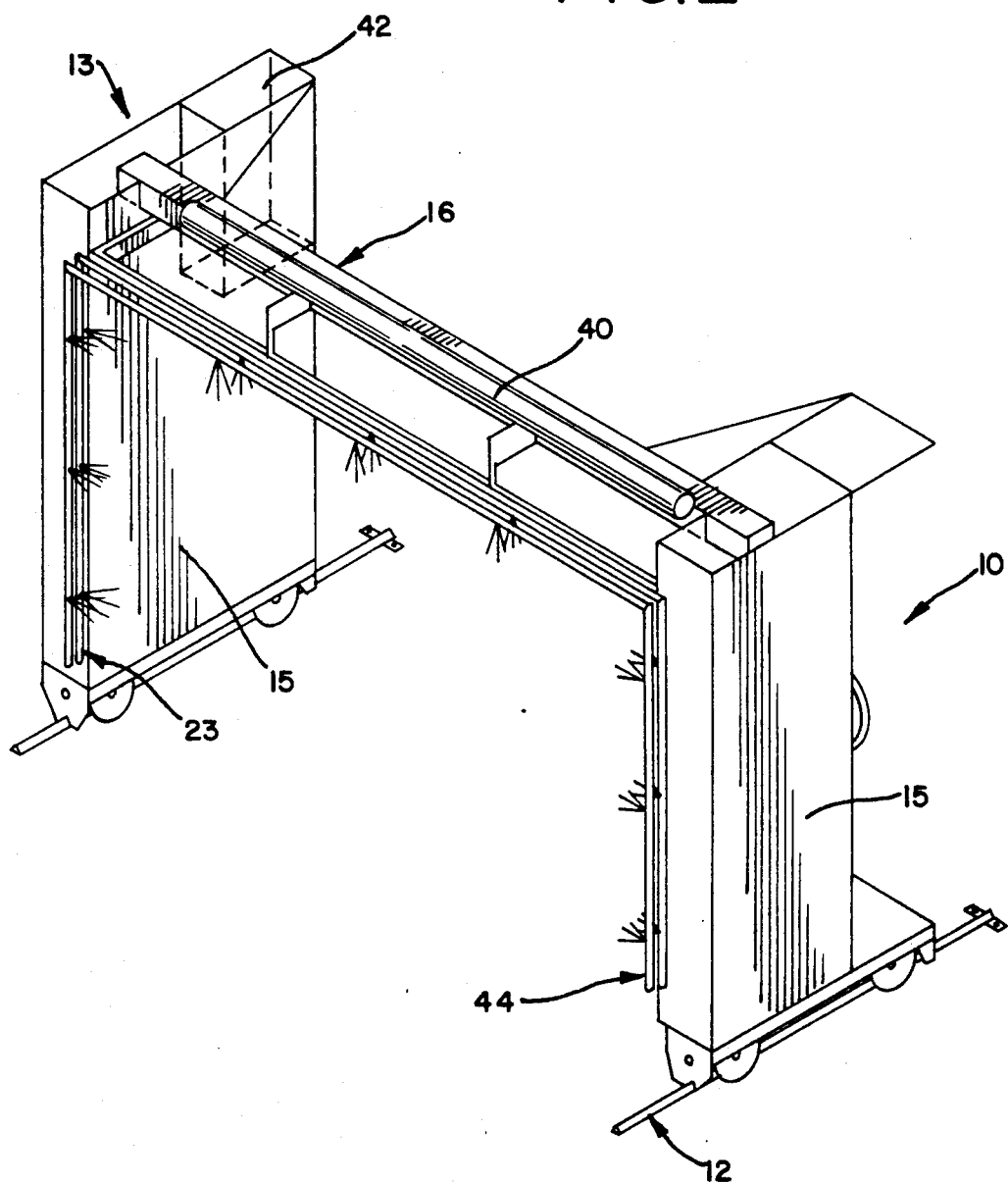
FIG. 2 is a perspective view of the front of the machine illustrated in FIG. 1, with parts removed.
Figure 3:
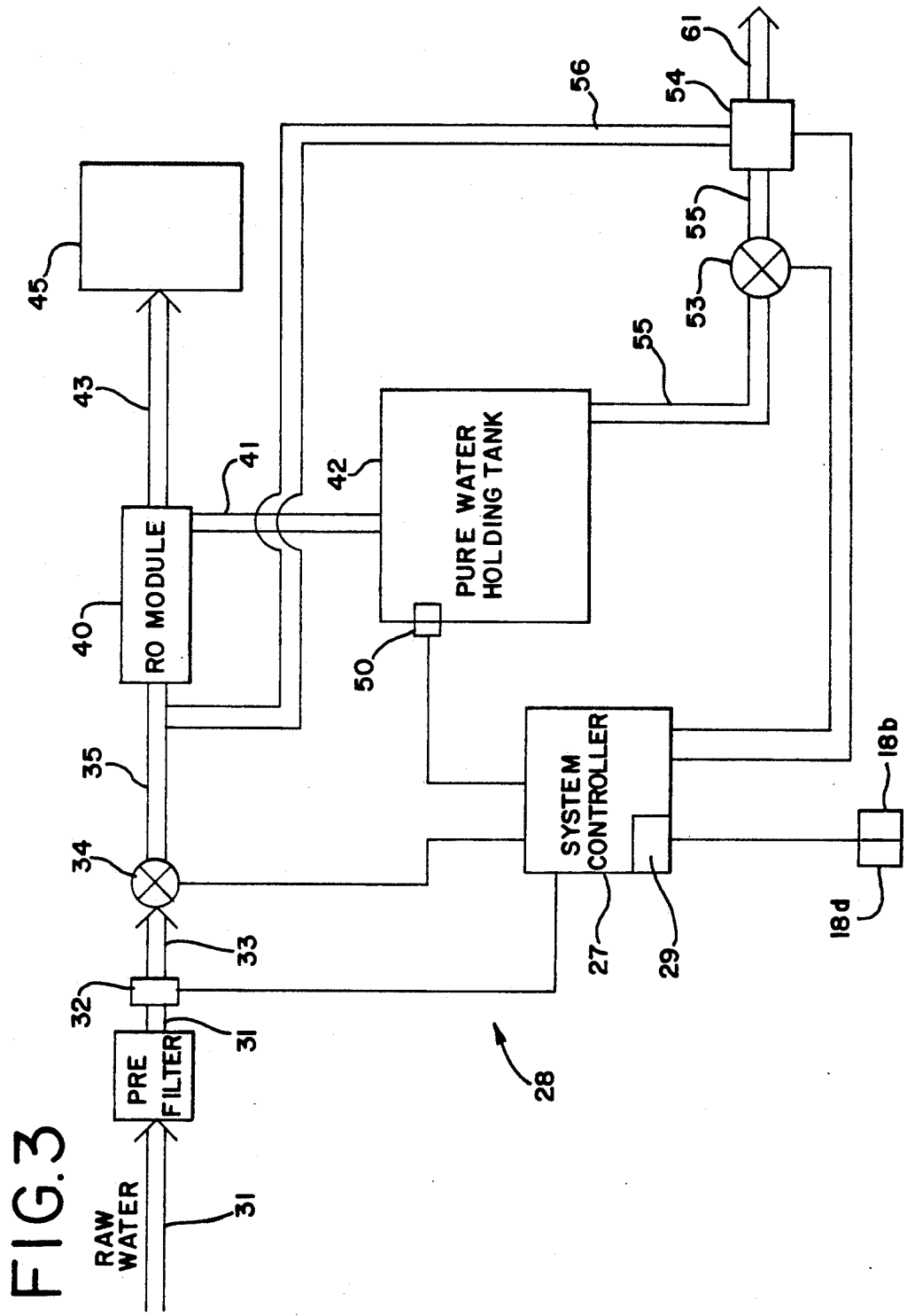
FIG. 3 is diagrammatic representation of the final rinse system in a semi-automatic car wash machine constructed in accordance with a preferred embodiment of the invention.

Referring to the drawings, and particularly to FIGS. 1 and 2, a semi-automatic car wash machine embodying the features of the present invention is illustrated generally at 10. The machine 10 includes a carriage 11 which travels on parallel tracks 12. The carriage 11 mounts a wash and rinse system 13. The carriage 11 is driven, and the system 13 controlled by an operator, to traverse a car (not shown) in a manner hereinafter described, and to wash and rinse the car while doing so.

The carriage 11 includes vertical side frames 15 which support a horizontally disposed roof frame 16. The frames 15 and 16 are structural steel components, fabricated in a well known manner and connected by conventional welding techniques.

An operator's console 17 is mounted on one side frame 15. To operate the wash and rinse system 13, the operator stands on a platform at the console 17 and drives the machine 10 forward (as seen in FIG. 1) under power from a conventional electric motor, traversing a car from front to back and then back to front. During this travel a conventional wash and initial rinse operation takes place. The operator initiates operation of the wash cycle by engaging switches 18a–18d. Operating switch 18c initiates a detergent injection function.

The wash operation is performed by rotating the wash units 20 and 21 with drive motors energized through control switches 18a and 18b, in a well known manner. Water into which a detergent is introduced is sprayed from a front, inner spray arch 23 and a rear spray arch 24 until the machine 10 reaches the rear of the car.

After traversing the car, front to rear, the operator disengages switch 18c to shut off the supply of detergent and reverses machine 10 travel direction. The machine 10 traverses the car rear to front, continuing to wash with unit 20 while initial rinse water is dispensed from both arches 23 and 24.

When the machine 10 reaches the front of the car again, the wash and initial rinse cycles have been completed. The wash and rinse system 13 is now ready for the final rinse operation using pure water produced by reverse osmosis. To begin this operation the operator drives the machine 10 to the rear of the car again, without any wash or rinse operations taking place.

At this point the operator engages switches 18b and 18d on the control panel. A controller 27 in the final rinse system 28 receives the signal. The controller 27, which is comprised of conventional switches, relays and timers cooperating in a manner described here functionally, initiates the final rinse cycle if one of those timers 29 has not rendered the subsystem 28 inoperative.

The timer 29 referred to had begun to run its preset time cycle when the operator engaged the detergent injection switch 18c at the outset of the wash and initial rinse operation. This made the system 28 operable for that preset period of time. The period selected is a time considered sufficient to wash, initially rinse and final rinse the car. Thus, after the car has been washed and initially rinsed, operation of the final rinse system 28 is possible. The operator engages switches 18b and 18d and the controller 27 responds by beginning the final rinse operation.

The operator then drives the machine 10 toward the front of the car again. The reverse-osmosis, final rinse system 28 functions automatically to spray pure rinse water from the outer arch 44 onto the car as this travel takes place.

The system 28 is designed to receive raw (tap) water from a suitable source through a conduit 31. When directed by the system controller 27, a valve 32 is opened and feed water passes through a pre-filter (unnumbered) and the valve 32, which controls the flow of feed water from the conduit 31 to a conduit 33.

The feed water enters a membrane pump 34 from the conduit 33. The pump 34 sends pressurized feed water, via conduit 35, to a reverse osmosis module 40. The reverse osmosis module 40 separates the feed water into mineral free permeate (pure water) and mineral rich concentrate by a conventional reverse osmosis process.

The permeate leaves the reverse osmosis module 40 through a conduit 41 and is directed to the permeate holding tank 42. The concentrate leaves the reverse osmosis module 40 through conduit 43 and is routed to the holding tank 45 in the main system 13 for use in a subsequent wash or rinse operation.

When the permeate produced by the system 28 rises in the holding tank 42 to the level of an upper float switch 50, the float switch is actuated and communicates with the system controller 27. The controller 27 then directs the control valve 32 and pump 34 to deliver sufficient additional water to the reverse osmosis module 40 to produce three to four more gallons of permeate.

The additional permeate produced is directed via conduit 41 to holding tank 42. After the additional three to four gallons of permeate is produced, the system controller 27 sends a signal to the valve 32 and pump 34 to stop the flow of raw feed water to the reverse osmosis module 40.

When the float switch 50 was actuated by the rising level of permeate, the system controller 27 also began a selected watch period. If the final rinse system 28 does not operate again before the end of that watch period, the system controller 27 causes a repressurization pump 53 to draw permeate from the holding tank 42 and directs it to control valve 54 through the conduit 55. The control valve 54 directs the permeate through conduit 56 and into conduit 35 near the entrance of the reverse osmosis module 40. Pump 53, directed by the system controller 27, pumps the permeate through the reverse osmosis module 40 to flush existing concentrate and bacteria from the membrane in the reverse osmosis module.

The system controller 27 causes the pump 53 to continue pumping permeate through the reverse osmosis module 40 until the additional three to four gallons of permeate have been forced from the holding tank 42. The pump 53 is then shut down; at a point where the level of permeate in holding tank 42 has not yet quite fallen to the level of float switch 50. The reverse osmosis module 40 has now been flushed and its membrane is immersed in permeate.

During the initial wash and rinse operation, water is directed under pressure from the holding tank 45 to spray arches 23 and 24. When the operator engages the switches 18b and 18d to initiate the final rinse, the system controller 27 directs repressurization pump 53 to pump permeate from holding tank 42 via conduit 55 to valve 54. The valve 54 directs the permeate via conduit 61 to the spray arch 44. The permeate is sprayed from arch 44.

During the final rinse operation, the permeate level in holding tank 42 falls to the level of float switch 50 and actuates it. This communicates with the system controller 27, and pump 34 and valve 32 are directed to send more raw feed water to the reverse osmosis module 40 to replenish the supply of permeate in the holding tank 42. As a result, the system automatically resupplies itself with permeate for the next final rinsing operation.

After the time period set by the timer 29 as sufficient to wash, rinse and final rinse the car, the timer 29 opens a switch in the controller 27 and renders the system 28 inoperative. As such, the system controller 27 limits pump 53 and valve 54 to delivering enough permeate to the spray arch 44 for one car only. Until the controller 27 is signalled again via operator switch 18c that another wash and initial rinse cycle has been initiated, the pump 53 and valve 54 will not function. When they are rendered functional, pump 53 and valve 54 again remain so only while the timer 29 runs through its set time period.

Although the invention has been described with a certain degree of particularity, it should be understood by those skilled in the art that various changes can be made to it without departing from the spirit or scope of the invention as hereinafter claimed.

I claim:

1. A car wash and rinse machine utilizing permeate from a reverse osmosis process for a final rinse operation, comprising:
   (a) a carriage mounted and adapted for travel on parallel tracks in one direction from one end of a stationary car to an opposite, other end of said car and in the opposite direction back;
   (b) said carriage having separate first and second car spray means mounted thereon;
   (c) a source of raw water;
   (d) a reverse osmosis unit means for receiving raw water from the source and separating it into permeate and concentrate;
   (e) means for directing raw water and concentrate to one holding tank;
   (f) means for directing permeate to another holding tank;
   (g) power means effective in a first operation to move said carriage in said one direction and in said opposite direction;
   (h) control means effective when operated during said first operation to cause raw water and concentrate to be delivered to said first spray means to wash and subsequentially initially rinse said car while said carriage is moving from one end of said stationary car to the other end and back;
   (i) said power means also being effective in a second operation to move said carriage again in said one direction and in said opposite direction;
   (j) said control means being effective during said second operation to cause permeate to be delivered to said second spray means to final rinse said car while said carriage is traveling for a second time in at least one of said directions.

2. The car wash and rinse machine of claim 1 further characterized in that:
   (a) said control means is operable to cause a final rinse to be performed only if a wash and initial rinse has first been performed by the machine.

3. The machine of claim 2 further characterized in that:
   (a) said control means includes timing means for setting a time period during which the final rinse must be performed;
   (b) said timing means being automatically energized to start said time period running when the control means is operated to initiate the wash and initial rinse.

4. The machine of claim 1 further characterized in that:
   (a) said means for directing is operable without requiring recycling of concentrate through said reverse osmosis unit.

5. The machine of claim 1 further characterized by and including:
   (a) means for automatically flushing the reverse osmosis unit with permeate and immersing a reverse osmosis membrane in the unit in permeate when the system has not been operated for a predetermined period of time after a series of washes and rinses.

* * * * *

UNITED STATES PATENT AND TRADEMARK OFFICE
CERTIFICATE OF CORRECTION

PATENT NO. : 5,160,430

DATED : November 3, 1992

INVENTOR(S) : WILLIAM J. GASSER et al.

It is certified that error appears in the above-identified patent and that said Letters Patent is hereby corrected as shown below:

ON THE TITLE PAGE

Item (75): "Inventors:", in the second line, please delete "Carco" and substitute therefor --Carico--.

Signed and Sealed this

Ninth Day of August, 1994

Attest:

BRUCE LEHMAN

Attesting Officer

Commissioner of Patents and Trademarks